United States Patent
Disori et al.

(10) Patent No.: US 12,510,308 B2
(45) Date of Patent: Dec. 30, 2025

(54) HEAT AUGMENTATION FEATURES IN A CAST HEAT EXCHANGER

(71) Applicant: United Technologies Corporation, Farmington, CT (US)

(72) Inventors: Michael A. Disori, Glastonbury, CT (US); William P. Stillman, Sturbridge, MA (US); Alexander Broulidakis, Tolland, CT (US); Dave J. Hyland, Portland, CT (US); Jeremy Styborski, East Hartford, CT (US); Adam J. Diener, Marlborough, CT (US); Matthew A. Devore, Rocky Hill, CT (US); Dominic J. Mongillo, Jr., West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 1233 days.

(21) Appl. No.: 16/280,179

(22) Filed: Feb. 20, 2019

(65) Prior Publication Data
US 2019/0310030 A1   Oct. 10, 2019

Related U.S. Application Data

(60) Provisional application No. 62/653,128, filed on Apr. 5, 2018.

(51) Int. Cl.
*F28F 3/06* (2006.01)
*F28F 1/02* (2006.01)
(Continued)

(52) U.S. Cl.
CPC .............. *F28F 3/06* (2013.01); *F28F 1/022* (2013.01); *F28F 1/26* (2013.01); *F28F 1/28* (2013.01);
(Continued)

(58) Field of Classification Search
CPC ...... F28F 1/00; F28F 1/02; F28F 1/022; F28F 1/10; F28F 1/12; F28F 1/14; F28F 1/26;
(Continued)

(56) References Cited

U.S. PATENT DOCUMENTS 2,183,956 A * 12/1939 Campbell ............. F28D 9/0081
165/145
4,516,632 A * 5/1985 Swift .................... F28D 9/0075
165/166
(Continued)

FOREIGN PATENT DOCUMENTS

DE   10212799 C1   9/2003
EP   0248222 A2   12/1987
(Continued)

OTHER PUBLICATIONS

Machine Translation JPS60238684A (Year: 1985).*
(Continued)

*Primary Examiner* — Eric S Ruppert
*Assistant Examiner* — Gustavo A Hincapie Serna
(74) *Attorney, Agent, or Firm* — Carlson, Gaskey & Olds, P.C.

(57) ABSTRACT

A featured embodiment of a cast plate heat exchanger assembly includes a cast plate including a plate portion defining a plurality of internal passages. A plurality of fin portions extend from the plate portion. First augmentation structures are disposed on surfaces of the fin portions for conditioning cooling airflow to enhance transfer of thermal energy. A method is also disclosed.

4 Claims, 7 Drawing Sheets

(51) Int. Cl.
  *F28F 1/26* (2006.01)
  *F28F 1/28* (2006.01)
  *F28F 3/04* (2006.01)
  *F28F 13/06* (2006.01)

(52) U.S. Cl.
  CPC .............. *F28F 3/048* (2013.01); *F28F 13/06* (2013.01); *F28F 2215/10* (2013.01)

(58) Field of Classification Search
  CPC ........ F28F 1/30; F28F 3/00; F28F 3/02; F28F 3/027; F28F 3/06; F28F 3/08; F28F 2215/00; F28F 9/02; F28D 1/053
  See application file for complete search history.

(56) References Cited

U.S. PATENT DOCUMENTS

| | | | |
|---|---|---|---|
| 4,729,428 A * | 3/1988 | Yasutake | F28D 9/0062 165/153 |
| 5,519,946 A * | 5/1996 | Renzi | F26B 5/06 34/239 |
| 6,402,464 B1 | 6/2002 | Chiu et al. | |
| 6,422,020 B1 | 7/2002 | Rice | |
| 6,612,808 B2 | 9/2003 | Lee et al. | |
| 7,775,053 B2 | 8/2010 | Joe et al. | |
| 7,913,750 B2 * | 3/2011 | Huang | F28F 1/128 165/152 |
| 8,894,367 B2 | 11/2014 | Lee et al. | |
| 9,810,071 B2 | 11/2017 | Papple | |
| 9,835,088 B2 | 12/2017 | Shchukin et al. | |
| 2008/0223560 A1 * | 9/2008 | Hoenisch | F28D 1/05383 165/145 |
| 2010/0326644 A1 | 12/2010 | Hung et al. | |
| 2011/0011570 A1 * | 1/2011 | Levings | F28F 9/18 165/166 |
| 2011/0132570 A1 * | 6/2011 | Wilmot | F28F 19/006 165/41 |
| 2013/0191079 A1 * | 7/2013 | Berukhim | F28F 9/028 703/1 |
| 2013/0292094 A1 | 11/2013 | Omori et al. | |
| 2018/0112923 A1 * | 4/2018 | Liu | F28F 1/128 |

FOREIGN PATENT DOCUMENTS

| | | | |
|---|---|---|---|
| JP | S60238684 A | * | 11/1985 |
| JP | 2011133198 A | * | 7/2011 |
| WO | 2004/068052 A1 | | 8/2004 |

OTHER PUBLICATIONS

Machine Translation JP 2011133198A (Year: 2011).*
JP2011133198A Machine Translation (Year: 2011).*
European Search Report for EP Application No. 19167396.1 dated Sep. 13, 2019.

* cited by examiner

HEAT AUGMENTATION FEATURES IN A CAST HEAT EXCHANGER

CROSS-REFERENCE TO RELATED APPLICATION

This application claims priority to U.S. Provisional Application No. 62/653,128 filed on Apr. 5, 2018.

BACKGROUND

A plate fin heat exchanger includes adjacent flow paths that transfer heat from a hot flow to a cooling flow. The flow paths are defined by a combination of plates and fins that are arranged to transfer heat from one flow to another flow. The plates and fins are created from sheet metal material brazed together to define the different flow paths. Thermal gradients present in the sheet material create stresses that can be very high in certain locations. Increasing temperatures and pressures can result in stresses on the structure that can exceed material and assembly capabilities.

Turbine engine manufactures utilize heat exchangers throughout the engine to cool and condition airflow for cooling and other operational needs. Improvements to turbine engines have enabled increases in operational temperatures and pressures. The increases in temperatures and pressures improve engine efficiency but also increase demands on all engine components including heat exchangers.

Turbine engine manufacturers continue to seek further improvements to engine performance including improvements to thermal, transfer and propulsive efficiencies.

SUMMARY

A featured embodiment of a cast plate heat exchanger assembly includes a cast plate including a plate portion defining a plurality of internal passages. A plurality of fin portions extend from the plate portion. First augmentation structures are disposed on surfaces of the fin portions for conditioning cooling airflow to enhance transfer of thermal energy.

In another embodiment according to the previous embodiment, a channel bottom is bounded by at least two of the plurality of fin portions and the first augmentation structures are further disposed on the channel bottom.

In another embodiment according to any of the previous embodiments, the first augmentation structures are disposed on both the channel bottom and sides of the fin portions.

In another embodiment according to any of the previous embodiments, the plurality of internal passages includes second augmentation structures that are an integral part of the plate portion.

In another embodiment according to any of the previous embodiments, at least one of the first augmentation structures and the second augmentation structures include trip strips.

In another embodiment according to any of the previous embodiments, the trip strips are orientated in one of an angled pattern, a chevron patter and a w-shaped pattern.

In another embodiment according to any of the previous embodiments, at least one of the first augmentation structures and the second augmentation structures include one of dimples, depressions and pedestals.

In another embodiment according to any of the previous embodiments, an inlet manifold and an outlet manifold are disposed on opposite ends of the cast plate and are in fluid communication with the plurality of internal passages. At least one of the inlet manifold and the outlet manifold include augmentation structures.

In another embodiment according to any of the previous embodiments, the plate portion, the fin portions and the first augmentation features are portions of a single unitary part.

In another featured embodiment, a cast plate heat exchanger assembly includes a cast plate including a plate portion defining a plurality of internal passages. A plurality of fin portions extend from the plate portion. First means for thermal energy transfer are disposed on surfaces of the fin portions for conditioning cooling airflow to enhance transfer of thermal energy.

In another embodiment according to the previous embodiment, a channel bottom is bounded by at least two of the plurality of fin portions and the first means for thermal energy transfer are further disposed on the channel bottom.

In another embodiment according to any of the previous embodiments, the plurality of internal passages include a second means for thermal energy transfer that are an integral part of the plate portion.

In another embodiment according to any of the previous embodiments, an inlet manifold and an outlet manifold are disposed on opposite ends of the cast plate and in fluid communication with the plurality of internal passages. At least one of the inlet manifold and the outlet manifold include a means for thermal energy transfer.

In another embodiment according to any of the previous embodiments, the plate portion, fin portions and the first means for thermal energy transfer are portions of a single unitary part.

In another featured embodiment, a method of assembling a heat exchanger includes forming a plate portion defining a plurality of internal passages. A plurality of fin portions are formed extending from the plate portion. First augmentation structures disposed on surfaces of the fin portions are formed for conditioning cooling airflow to enhance transfer of thermal energy.

In another embodiment according to the previous embodiment, cast plate, plurality of fin portions and first augmentation features are formed as single unitary cast structure.

In another embodiment according to any of the previous embodiments, a channel bottom is formed bounded by at least two of the plurality of fin portions and forming the first augmentation structures to be disposed on the channel bottom.

In another embodiment according to any of the previous embodiments, the first augmentation structures are formed on both the channel bottom and sides of the fin portions.

In another embodiment according to any of the previous embodiments, second augmentation structures are formed on walls of the plurality of internal passages.

In another embodiment according to any of the previous embodiments, at least one of the first augmentation structures and the second augmentation structures are formed as trip strips. The trip strips are formed in an orientation as one of an angled pattern, a chevron patter and a w-shaped pattern.

In another embodiment according to any of the previous embodiments, at least one of the first augmentation structures and the second augmentation structures include one of dimples, depressions and pedestals.

In another embodiment according to any of the previous embodiments, forming augmentation structures on at least one of an inlet manifold and an outlet manifold and attaching the inlet manifold and outlet manifold to opposite ends of the plate portion in fluid communication with the plurality of internal passages.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
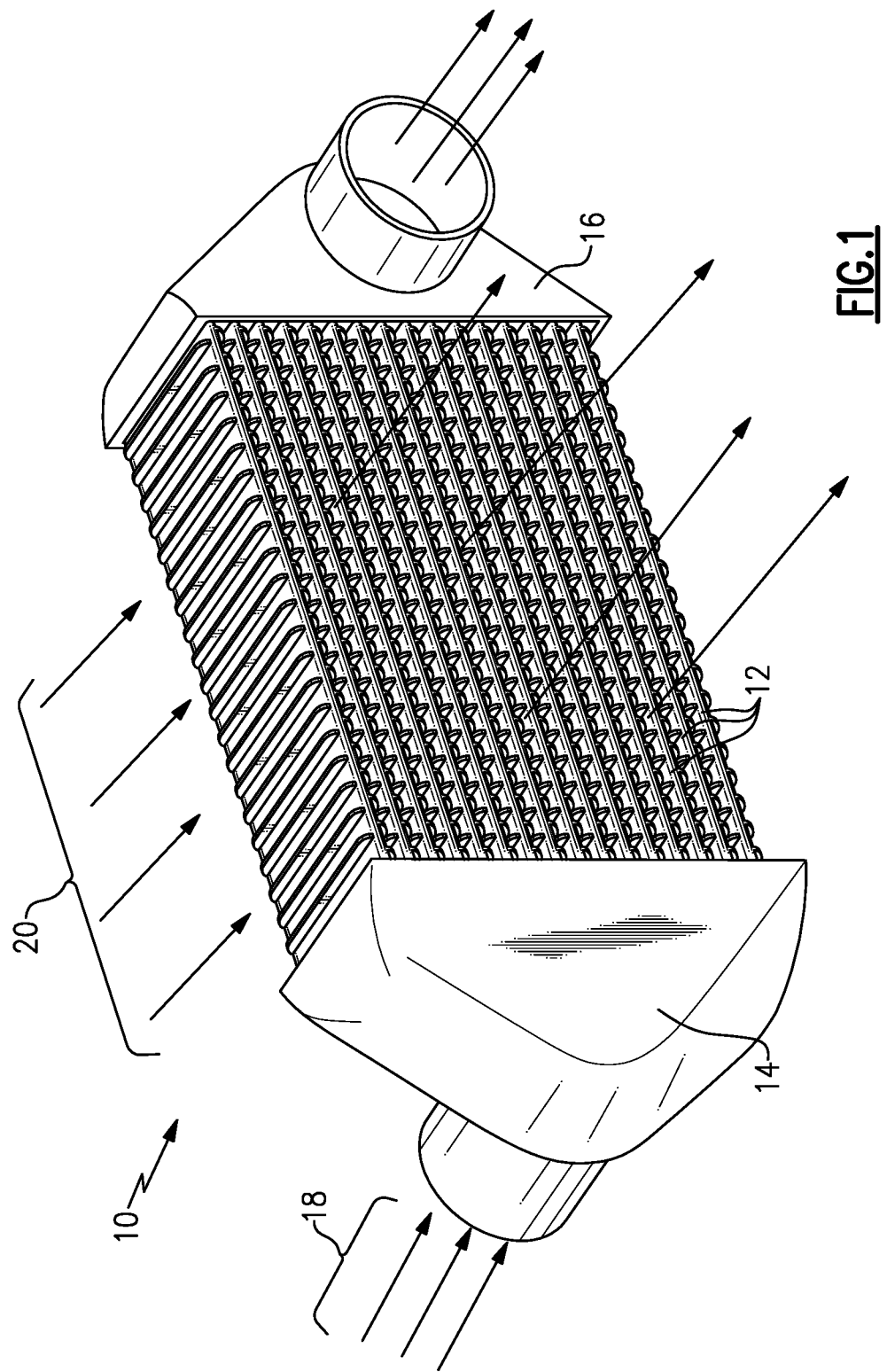
FIG. 1 is a perspective view of an example heat exchanger assembly.

Referring to FIG. 1, an example heat exchanger assembly 10 is schematically shown and includes a plurality of plate assemblies 12 disposed between an inlet manifold 14 and an outlet manifold 16. A hot airflow 18 is introduced through the inlet manifold 14 and flows through the plurality of plate assemblies 12. Each of the plate assemblies 12 define a plurality of passages for the hot airflow 18. A cooling airflow 20 flows through against outer surfaces of each of the plate assemblies 12. The cooling airflow 20 removes thermal energy within the plate assembly 12 from the hot airflow 18.

Figure 2:
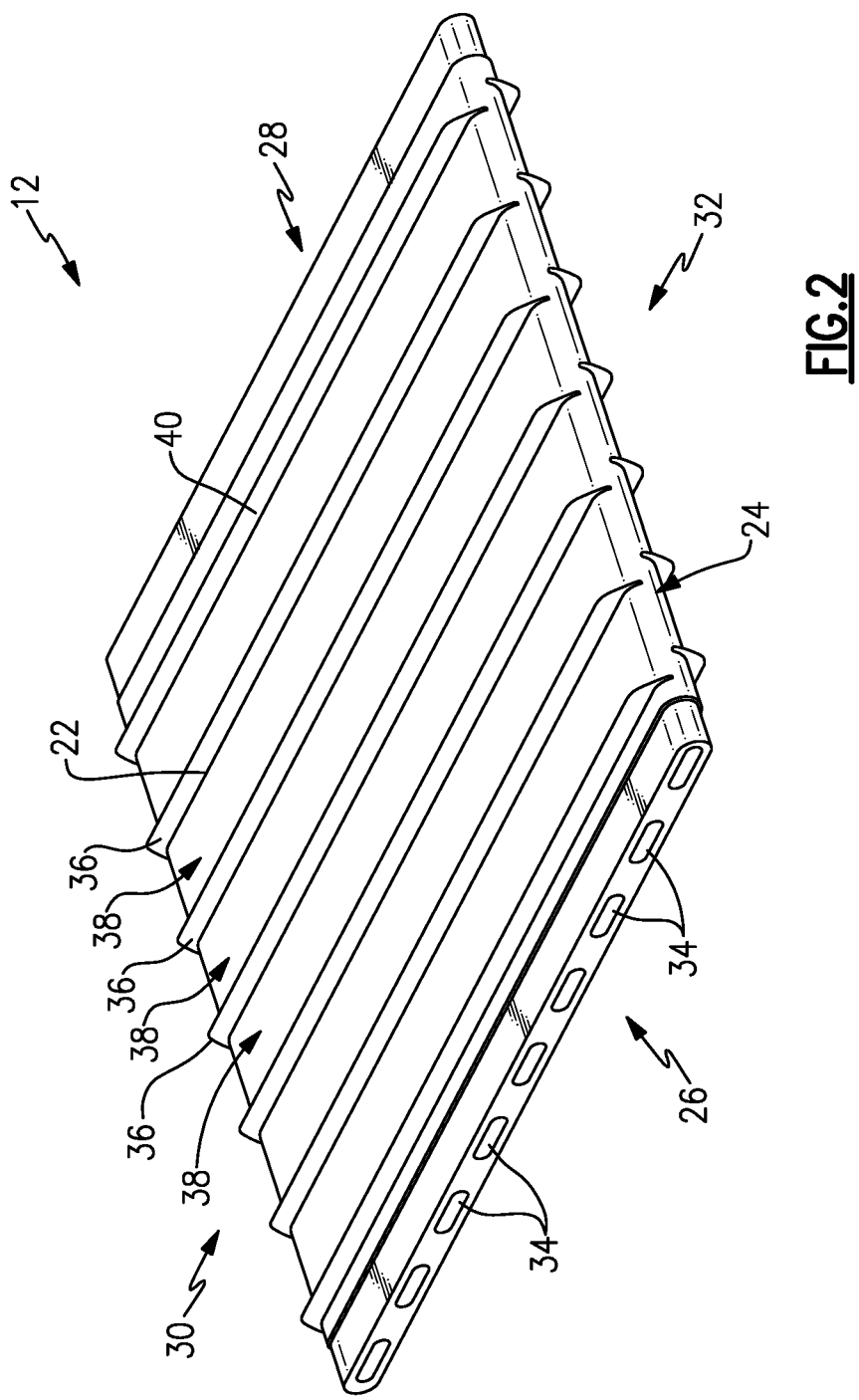
FIG. 2 is a perspective view of an example cast plate assembly.

Referring to FIG. 2 with continued reference to FIG. 1, each of the example plate assemblies 12 are cast structures that include features for enhancing heat transfer from the hot flow 18 to the cooling flow 20. The example plate assembly 12 includes a top surface 22, a bottom surface 24, an inlet face 26, and an outlet face 28. It should be appreciated that the top surface 22 and the bottom surface 24 in the disclosed example plate assembly 12 are substantially identical. Moreover, the inlet face 26 and the outlet face 28 are also substantially identical to provide a symmetrical plate with a plurality of passages 34 that extend from the inlet side face 26 to the outlet face 28. Moreover, although described by way of example as top, bottom, inlet and outlet, such descriptions are by way of example and to indicate a relative position and are not meant to be limiting.

The top surface 22 and the bottom surface 24 include a plurality of fins 36 that define cooling channels 38 for the cooling flow 20. Each of the cooling channels 38 include a channel bottom 40 and a plurality of augmentation features such as trip strips. The trip strips are walls that extend from the heat transfer surfaces into the flow to disrupt flow in a manner that enhances thermal transfer. Incoming cooling airflow 20, first contacts both the top and bottom surfaces 22, 24 at the leading edge 30 of each of the channels 38. The cooling airflow 20 then accepts heat through the surfaces provided in the channels 38 and the fins 36 and exits the trailing edge 32 of the plate assembly 12.

Figure 3:
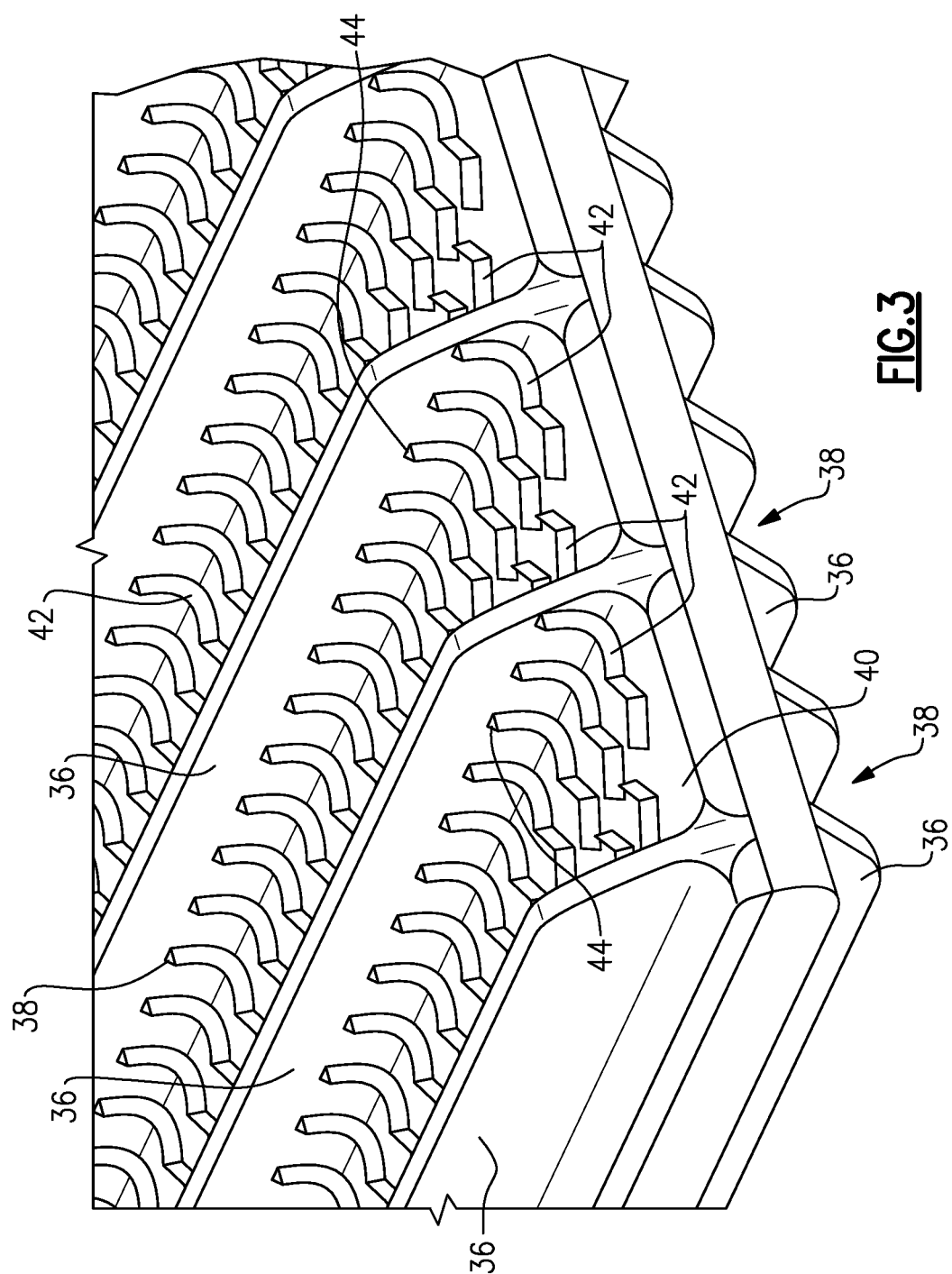
FIG. 3 is a perspective view of a portion of the example plate assembly.

Referring to FIG. 3 with continued reference to FIG. 2, each of the plurality of channels 38 is bounded by fins 36. Each of the fins 36 include side walls 44. Augmentation features such as trip strips 42 illustrated in this example embodiment disrupt a thermal boundary layer to enhance transfer thermal energy. In the example disclosed in FIG. 3, the trip strips 42 are walls that extend outward into the flow and are integral features of the channel bottom 40 and side walls 44.

Figure 4:
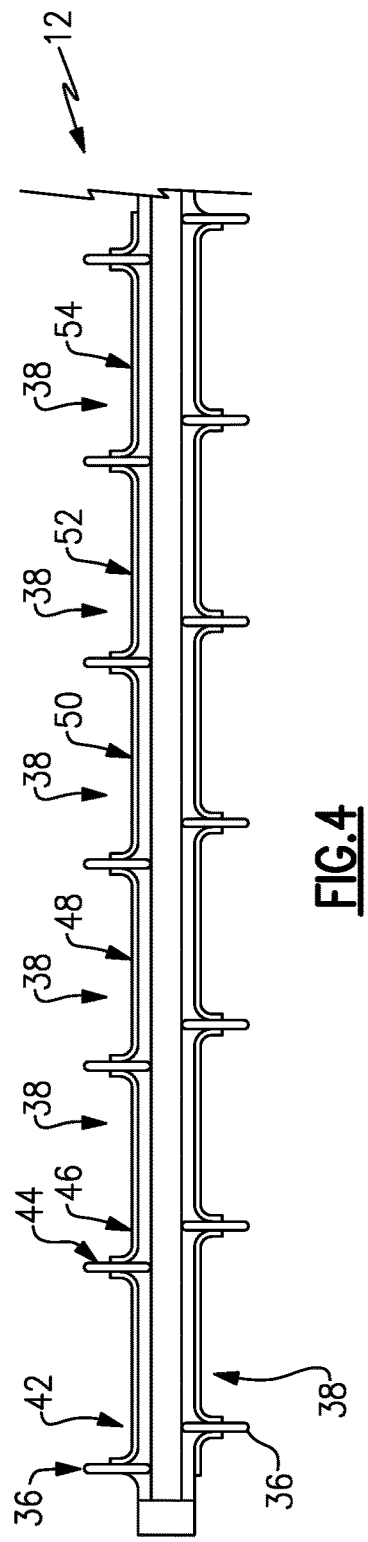
FIG. 4 is a side view of the example plate assembly.
Figure 5:
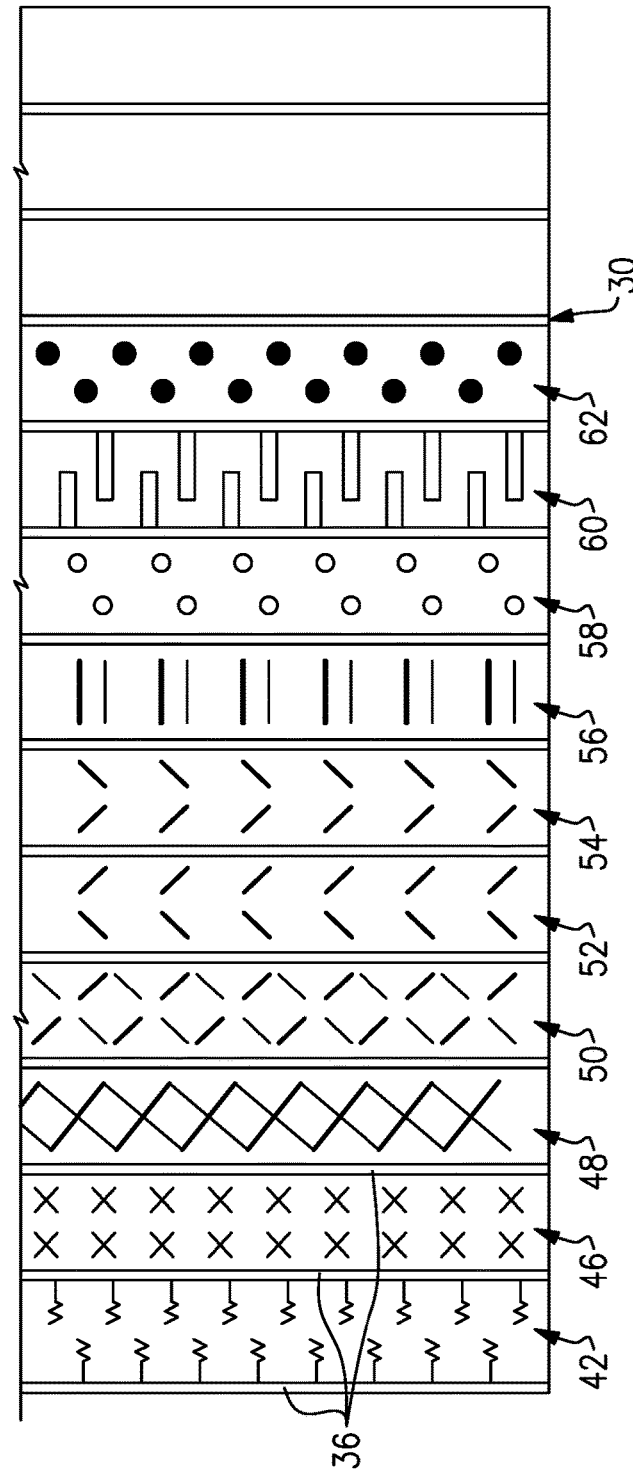
FIG. 5 is a schematic view of augmentation features integrated into the example plate assembly.

Referring to FIGS. 4 and 5 with continued reference to FIG. 3, the example plate assembly 12 is shown in a side view to illustrate the channels 38 bounded on each side by the fins 36. In the example illustrated in FIGS. 4 and 5, each of the channels 38 includes a schematic representation of different augmentation structures that can be utilized within the bounds and scope of this disclosure to enhance thermal transfer.

In this example, one of the channels 38 includes trip strips 42 that are walls that extend outward into the cooling airflow 20 from the channel bottom 40 and sidewalls 44. The example trip strips 42 include a generally W-shape on the channel bottom 40 and extend up the side walls 44 of each of the fins 36.

Another channel 38 includes trip strips 46 that are walls that extend upward from the channel bottom 40 in a generally x-shaped patterns. Another channel 38 includes trip strips 48 and include walls in another generally x-shaped pattern along the channel bottom 40 bounded by the fins 36. The walls of any of the trip strips 42, 46, and 48 can be the same thickness, or may vary in thickness depending on localized thermal conduction requirements.

Another channel 38 includes trip strips 50 that illustrate another version of walls generally arranged in an x-shaped pattern to disrupt laminar flow through the channels 38 bounded by the fins 36.

Trip strip thermal transfer augmentation features 52 and 54 include walls arranged generally in chevron shapes that are either directed towards or against incoming flow to further condition and change flow characteristics within each of the channels to enhance remote transfer.

Thermal transfer augmentation trip strips 56 include walls that extend into the flow from the channel bottom 40 that are arranged substantially perpendicular to flow. The perpendicular orientation of the trip strips 56 is an example of wall structures that could be utilized within the scope of this disclosure to disrupt flow to enhance thermal transfer.

Another example augmentation feature includes pedestals 58 that extend into the flow from the channel bottom 40 and side walls 44. The pedestals 58 may be arranged in an alternating fashion as illustrated as well as other orientations intended to disrupt flow and improve thermal transfer.

Thermal transfer augmentation structures 60 and 62 illustrate different examples that can condition flow. In this example, grooves 60 and depressions 62 are provided on both the channel bottom 40 and side walls 44. The grooves 60 and depressions are disclosed examples of structures other than trip strips that enhances thermal transfer by inducing different flow properties onto the relevant flow. The grooves 60 and depressions can be on either the channel bottom 40, the side walls 44 or both within the scope of this disclosure.

It should be appreciated that each of the augmentation structures illustrated in FIG. 5 could be utilized on any of the surfaces of the plate assembly 12. Moreover, the augmentation structure could be utilized in different combinations. In the illustrated example, the augmentation structures are illustrated on the outer surface to condition the cooling flow between adjacent fins 36. Augmentation features such as those disclosed in FIG. 5 are also contemplated for use on inner surfaces. It should be understood that the disclosed augmentation structures illustrated in FIG. 5 are provided by way of example and other structures, features, and orientations of augmentation structures to improve thermal transfer, are within the scope and contemplation of this disclosure.

Figure 6:
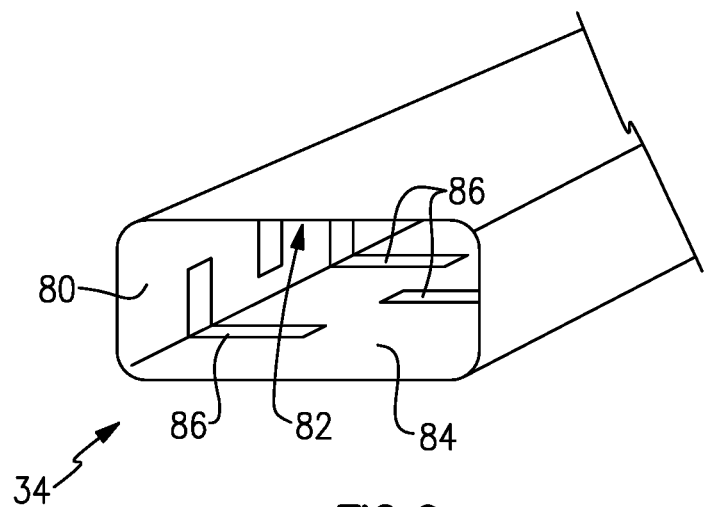
FIG. 6 is a perspective view of an example internal passage.
Figure 7:
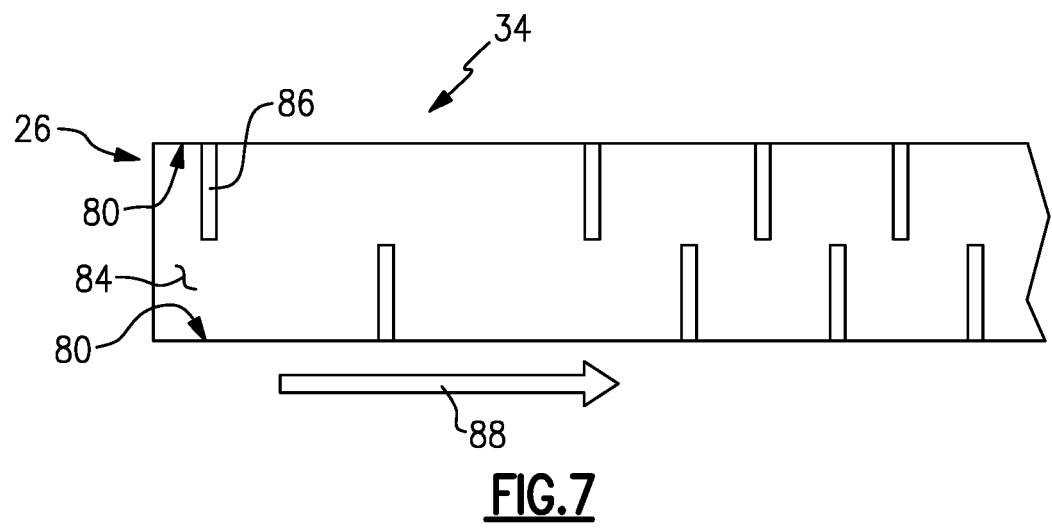
FIG. 7 is a schematic view of a portion of an example internal passage.

Referring to FIGS. 6 and 7, an example passage 34 is schematically illustrated to demonstrate that augmentation features 86 are also provided within internal passages 34 to further disrupt the hot flow 18. The example augmentation features 86 are trip strips disposed on surfaces 82, 84, and 80 of the passage 34. The example trip strips 86 are orientated transverse to flow and the longitudinal length of the passage 34. Moreover, different orientations and structures of augmentation features could be utilized within the scope and contemplation of this disclosure. Disruption of the different flows disrupts the laminar thermal layer along the sides and edges of the passages 34 to enhance thermal transfer.

Additionally, the trip strips 86 are arranged according to a density that varies relative to a distance from the inlet face 26. As appreciated, the hottest of the hot flow 18 is present at the inlet face 26 before substantially any thermal transfer to the plate. The reduced density near an inlet face 26 enables control and definition of thermal gradients that can be tailored to reduce mechanical stresses.

The density of trip strips 86 increases in the direction indicated by arrow 88 away from the inlet face 26. It should be appreciated that the density or a number of augmentation features over a specific length or surface of a cooling channel or passage, can be manipulated and adjusted to accommodate and provide a substantial uniform thermal gradient within surfaces and in areas of each plate portion. The densities may be utilized to tailor and modify stresses that are encountered due to the differences in temperature between the cooling airflow 20 and the hot airflow 18 that can generate non-uniform thermal gradients that increase stresses within the plate assembly.

Figure 8:
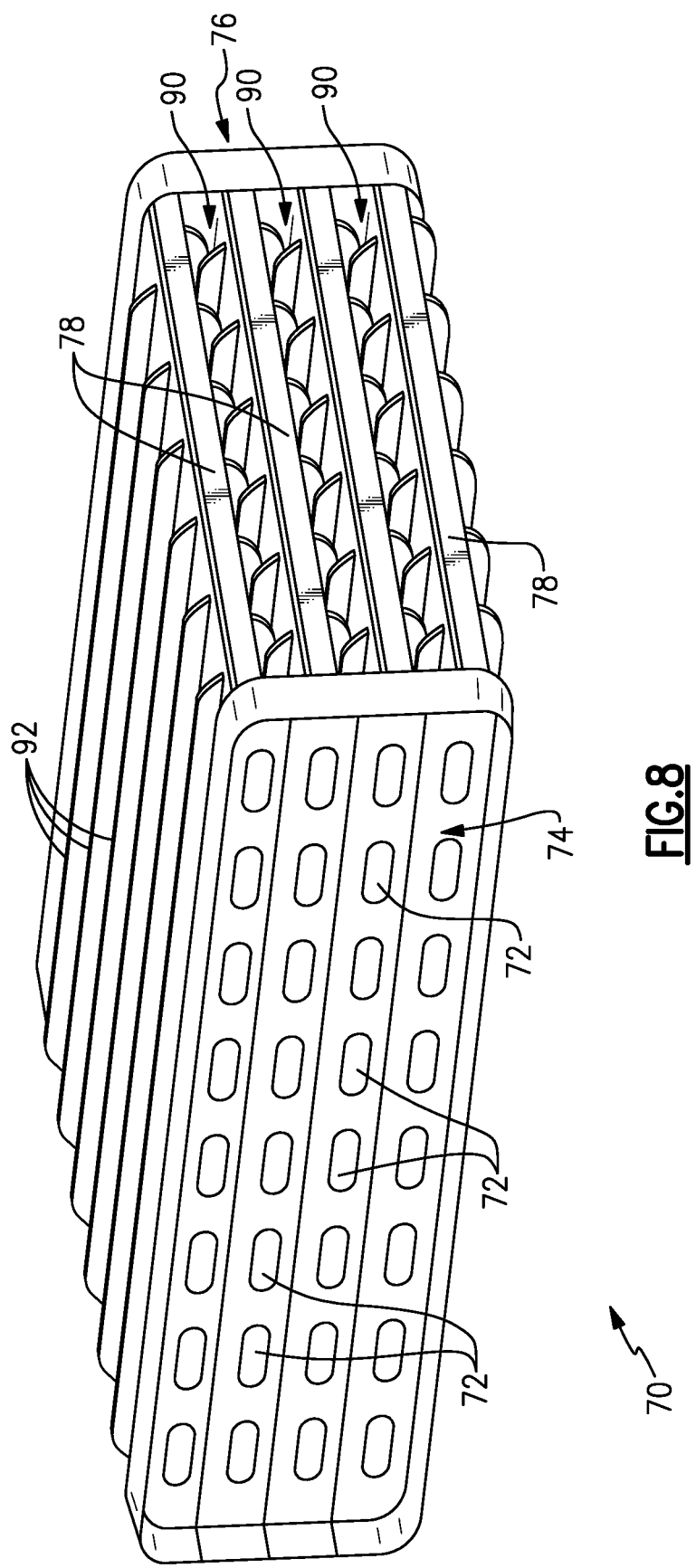
FIG. 8 is a perspective view of another example plate assembly.

Referring to FIG. 8, another example plate assembly 70 is shown that includes a plurality of plate portions 78 that extend between a common inlet face 74 and outlet face 76. Each of the plate portions 78 define a plurality of passages 72 therethrough for the hot flow 18. Cooling air flows over top and bottom surfaces of the plate portion 78 within spaces 90 defined between the plate portions 78.

Figure 9:
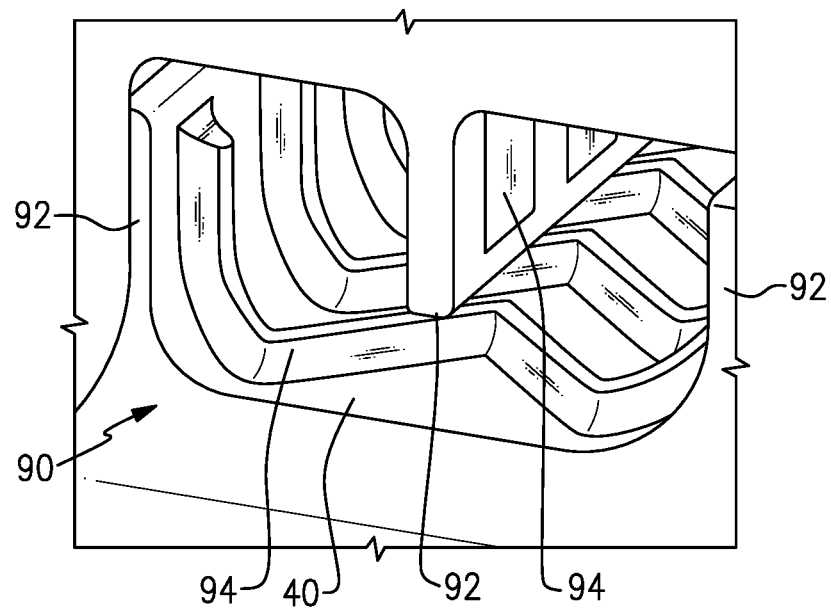
FIG. 9 is a perspective view of a portion of an example cooling channel
Figure 10:
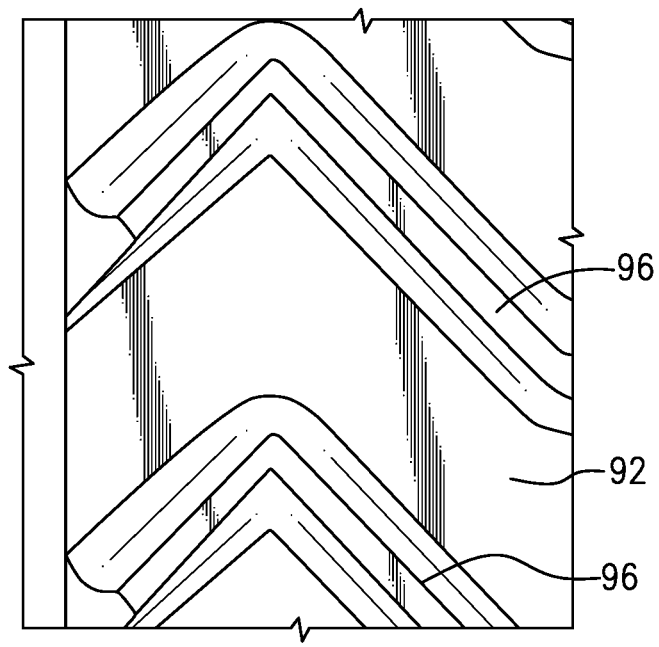
FIG. 10 is schematic view of a portion of an example augmentation feature on a surface of the plate assembly.

Referring to FIGS. 9 with continued reference to FIG. 10, fins 92 within each of the spaces 90 extend outward and in an alternating fashion with one fin 92 extending upward from a bottom plate portion 78, the next fin 92 extending downward from an upper plate portion 78 and a further fin extending upward from the bottom plate portion 78. Accordingly, the spaces 90 include heat transfer augmentation features for each adjacent plate portion 78.

The example space 90 is illustrated in an enlarged perspective view and includes the fins 92 with augmentation structures 94. In this example, the augmentation structures 94 are walls that extend perpendicular to the channel bottom 40 and the sides of fins 92. The fins 92 extend from adjacent plate portions 78 and include augmentation features 94.

Referring to FIG. 10, another example augmentation structure is a groove 96 disposed in the fins 92 and also may be provided in the channel bottoms within the spaces 90. The grooves 96 can be disposed much like the walls 94 illustrated in the previous figure. The grooves 96 can be provided on either outer or inner surfaces of the plate assembly 70 or 12 to provide and enhance thermal transfer.

The example plate assemblies 12 and 70 are cast plates that are single unitary structures. Moreover, the plate assemblies 12 and 70 may also be cast as separate cast portions that are latter assembled. The casting process enables the formation of relatively complex augmentation features on thermal transfer surfaces that otherwise may not be practical. The materials and casting processes utilized to form the cast plate assemblies 12, 70 can be of any known casting technique including equiaxed and directional solidification casting.

The disclosed examples of a cast plate assembly includes augmentation structures on any surface to disrupt laminar thermal flow to enhance thermal transfer.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A cast plate heat exchanger assembly comprising:
a cast plate including a plate portion defining a plurality of internal passages extending between an inlet face and an outlet face and contained between a top surface and a bottom surface, a plurality of fin portions extending from an external surface of one of the top surface and the bottom surface, a first flow disrupting means for thermal energy transfer disposed on surfaces of the plurality of fin portions for conditioning cooling airflow to enhance transfer of thermal energy and a channel bottom defined as a portion of the external surface bounded by at least two of the plurality of fin portions with the first flow disrupting means for thermal energy transfer further disposed on the channel bottom.

2. The heat exchanger as recited in claim 1, wherein the plurality of internal passages include a second flow disrupting means for thermal energy transfer that are an integral part of the plate portion.

3. The heat exchanger as recited in claim 1, including an inlet manifold and an outlet manifold disposed on opposite ends of the cast plate and in fluid communication with the plurality of internal passages, wherein at least one of the inlet manifold and the outlet manifold include a flow disrupting means for thermal energy transfer.

4. The heat exchanger as recited in claim 1, wherein the plate portion, fin portions and the first means for thermal energy transfer are portions of a single unitary part.

* * * * *